(No Model.)
J. E. WELLING.
EGG BEATER.
No. 299,884. Patented June 3, 1884.
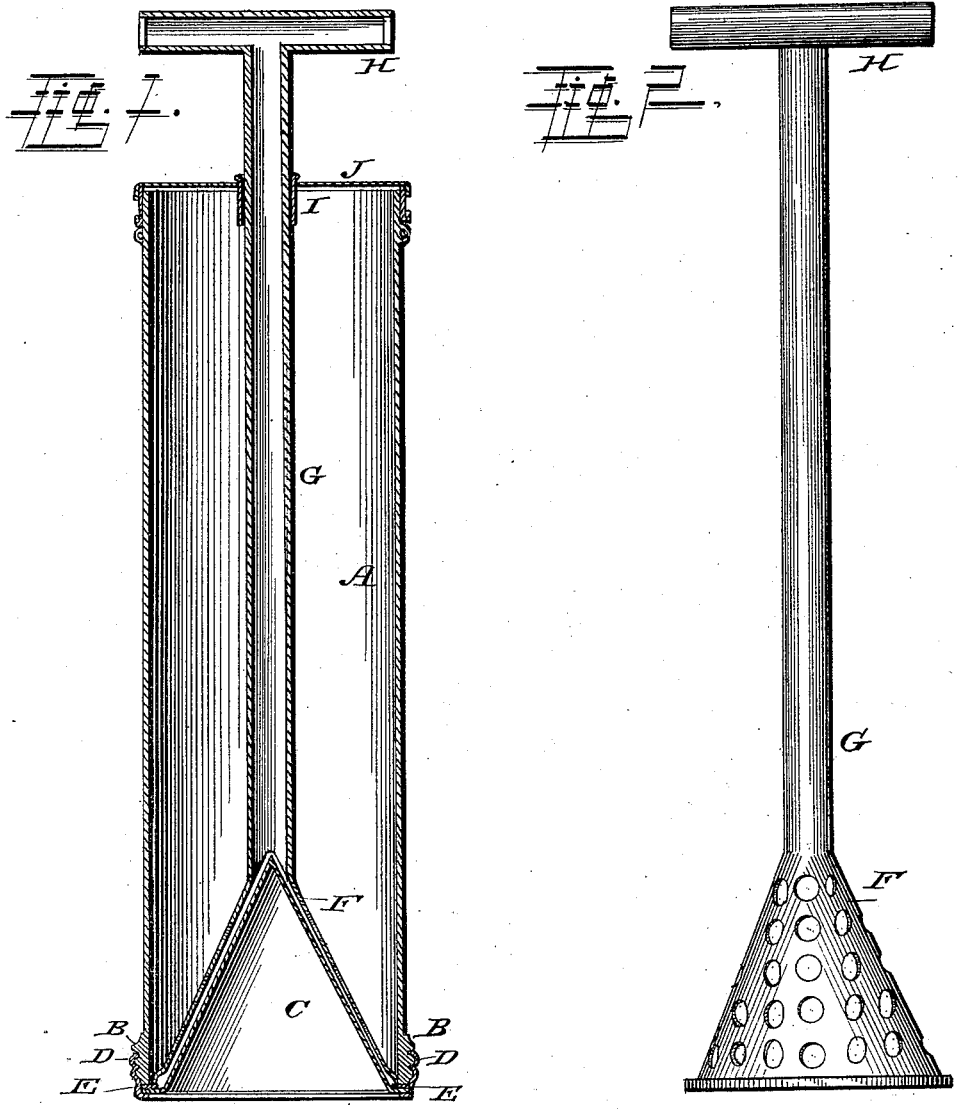
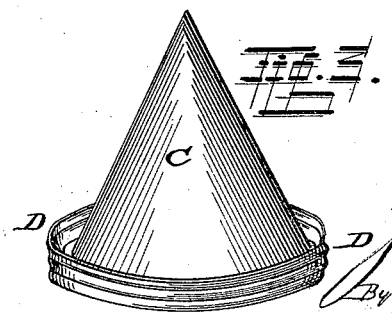

UNITED STATES PATENT OFFICE.

JOHN EDWARD WELLING, OF GEORGETOWN, KY., ASSIGNOR OF TWO-THIRDS TO JUSTICE WEBB AND JAMES E. CANTRIL, BOTH OF SAME PLACE.

EGG-BEATER.

SPECIFICATION forming part of Letters Patent No. 299,884, dated June 3, 1884.

Application filed March 24, 1884. (No model.)

*To all whom it may concern:*

Be it known that I, JOHN E. WELLING, a citizen of the United States, and a resident of Georgetown, in the county of Scott and State of Kentucky, have invented certain new and useful Improvements in Egg-Beaters; and I do hereby declare that the following is a full, clear, and exact description of the invention, which will enable others skilled in the art to which it appertains to make and use the same, reference being had to the accompanying drawings, which form a part of this specification, and in which—

Figure 1 is a longitudinal sectional view of my improved egg-beater. Fig. 2 is a side view of the dasher or beater removed from the cylindrical casing, and Fig. 3 is a perspective view of the removable conical bottom detached from the cylinder.

Similar letters of reference indicate corresponding parts in all the figures.

My invention has relation to that class of egg-beaters in which a vertically-reciprocating dasher or beater of a funnel shape or cone shape works within a cylinder having a cone-shaped bottom adapted to fit into the conical dasher; and it consists in constructing the outside casing or cylinder with a removable cone bottom, whereby the casing and its bottom may be thoroughly and effectually cleaned after use.

In the accompanying drawings, A is a cylindrical shell or casing made of sheet metal, glass, stoneware, or any other suitable material open at both ends, and provided at its lower end with a screw-threaded part or flange, B.

C is the removable cone bottom, which may be solid or hollow, as desired, and which is provided with a screw-threaded rim or flange, D, adapted to be screwed upon flange B of cylinder A. If desired, a packing-ring or gasket, E, may be placed around the base of the cone, so as to be screwed up against the lower rim of the cylinder, and form a perfect joint which will effectually prevent leakage.

F is the conical dasher or beater, and G the staff of the same, which has a cross-head or handle, H, at its upper end for operating it. The staff is inserted through a central flanged aperture, I, in the removable flanged cover J, which is adapted to fit tightly over the open top of cylinder A.

From the foregoing description, taken in connection with the drawings, the operation and advantages of my improved egg-beater will be readily understood without requiring further explanation. It may be used in beating up eggs or cream, and for several other culinary and domestic purposes, which will readily suggest themselves to the intelligent housekeeper. By unscrewing the conical bottom any impurities or sediment which may have collected in the narrow space around the base of the cone can be removed without the least difficulty, thus always keeping the apparatus perfectly sweet and clean, and in good working condition.

Having thus described my invention, I claim and desire to secure by Letters Patent of the United States—

1. The combination of the open cylindrical shell A, having the threaded bottom flange, B, removable cone bottom C, having threaded flange D, conical beater F, having the staff G, and cross-head H, and removable cover J, having the central flanged aperture, I, substantially as and for the purpose herein shown and specified.

2. In an egg-beater of the described class, the combination, with the cylindrical shell or casing A, of the removable cone bottom C, projecting into the cylinder, substantially as and for the purpose herein shown and specified.

In testimony that I claim the foregoing as my own I have hereunto affixed my signature in presence of two witnesses.

JOHN EDWARD WELLING.

Witnesses:
W. T. SHEPARD,
T. FRANK SHERRITT, Jr.